United States Patent [19]

Reichert et al.

[11] Patent Number: 4,569,024

[45] Date of Patent: Feb. 4, 1986

[54] PROCESS AND INSTALLATION FOR THE TREATMENT OF ROUGH SHEETS ISSUING FROM A ROLLING MILL FOR FLAT PRODUCTS

[75] Inventors: Joseph Reichert, Pagny sur Moselle; Hervé Gillet, Longwy, both of France; Jean M. Stasser, Lamorteau, Belgium

[73] Assignee: Union Siderurgique du Nord et de l'Est de la France (USINOR), Puteaux, France

[21] Appl. No.: 531,646

[22] Filed: Sep. 13, 1983

[30] Foreign Application Priority Data

Jul. 5, 1982 [FR] France .................. 82 11755

[51] Int. Cl.⁴ .............................................. G01B 11/00
[52] U.S. Cl. .................. 364/475; 250/561; 33/DIG. 21
[58] Field of Search ............... 250/560, 561, 571; 33/18 R, 21 R, DIG. 21; 364/475, 472, 525

[56] References Cited

U.S. PATENT DOCUMENTS

3,274,390 9/1966 Umbel ................. 250/560
4,188,544 2/1982 Chasson ................. 250/560

Primary Examiner—Jerry Smith
Assistant Examiner—Allen MacDonald
Attorney, Agent, or Firm—Cushman, Darby & Cushman

[57] ABSTRACT

The process is for cutting rough mother sheets TM issuing from a rolling mill into daughter sheets of predetermined dimensions. In the course of this process, there is determined the inscribability of each mother sheet so as to establish a marking plan permitting an optimum utilization of the sheet. Each mother sheet is passed through devices 5, 6 for cutting the sheet to dimensions and cutting the daughter sheets. The determination of the inscribability comprises projecting onto the mother sheet TM a network of crossing luminous lines $t_1$, $t_2$, $t_3$-a to $t_3$-g, selectively shifting each of the luminous lines while maintaining it parallel to itself so as to define on the mother sheet a batch of daughter sheets to be obtained, determining the coordinates of the luminous lines relative to a reference system pertaining to the mother sheet, and cutting the mother sheet in accordance with the obtained coordinates.

27 Claims, 8 Drawing Figures

PROCESS AND INSTALLATION FOR THE TREATMENT OF ROUGH SHEETS ISSUING FROM A ROLLING MILL FOR FLAT PRODUCTS

DESCRIPTION

The present invention relates to the treatment of rough sheets (hereinafter termed mother sheets) of great thickness and large dimensions issuing from a rolling mill.

The treatment of products issuing from a set of rolls of a rolling mill for flat products comprises first of all a determination of "inscribability" in the rough sheet and then a cutting to more precise dimensions by means of shears.

The term "inscribability" here means the possible distribution in a given mother sheet of sheets to be cut out (hereinafter termed daughter sheets) in accordance with acutting procedure implying a minimum loss of metal bearing in mind the unevenness of the edges of the mother sheet and defects within the sheet.

At the present time, the determination of the inscribability is effected above all by laying out by means of a piece of chalk and by an approximate estimation. In the course of the manual process, the laying out operator moves over the sheet and notes the zone or zones which are utilizable, declares by approximate estimations the partial or total inscribability of the daughter sheets and proceeds to a determination of the remaining recoverable zones, as the case may be. Once the layout has been established, it is transmitted to the shear operators for shearing the edge portions and cutting to length.

It will be obvious that this process is not appropriate for a modern industrialization, since it requires considerable labour, results in division errors and is consequently costly.

In order to assist the laying out operator in his work, it is already known to dispose along the roller table on which the mother sheet is disposed for the laying out, a rod provided with light sources which permit the definition of one more lines on the sheet in the direction of the length thereof. However, it has been found that this single aid can only very slightly improve the manual process described hereinbefore and in no way does away with the calculating and the laying out performed by the laying out operator for the division of the mother sheet into daughter sheets in the direction of the length of the sheet.

Consequently, an object of the invention is to provide a process and an installation for the treatment of mother sheets issuing from a rolling mill which completely avoid the aforementioned drawbacks.

The invention therefore provides a process for the treatment of mother sheets issuing from a rolling mill for the purpose of cutting up these sheets into daughter sheets of predetermined dimension, in the course of which the process comprises determining the inscribability of each mother sheet for establishing a layout permitting the optimum utilization of the mother sheet, then passing each mother sheet into means for cutting the mother sheet into daughter sheets to the desired dimensions, the operation for determining the inscribability comprising projecting onto the mother sheet a network of crossed luminous lines, selectively displacing each of said luminous lines while maintaining the luminous line parallel to itself so as to define on the mother sheet a batch of daughter sheets to be obtained, determining the coordinates of the luminous lines relative to a reference system pertaining to the mother sheet, and cutting the mother sheet in accordance with the coordinates obtained.

By means of these features, the laying out can be carried out by an operator placed in an observing cab, by an appropriate control of the luminous lines, which renders this work convenient and precise, it being possible to transmit the determined coordinates easily to the shears for cutting the sheet to the required dimensions.

The invention also provides an installation for carrying out the process defined hereinbefore.

Further features of the invention will be apparent from the following description which is given merely by way of example with reference to the accompanying drawings, in which.

Figure 1:
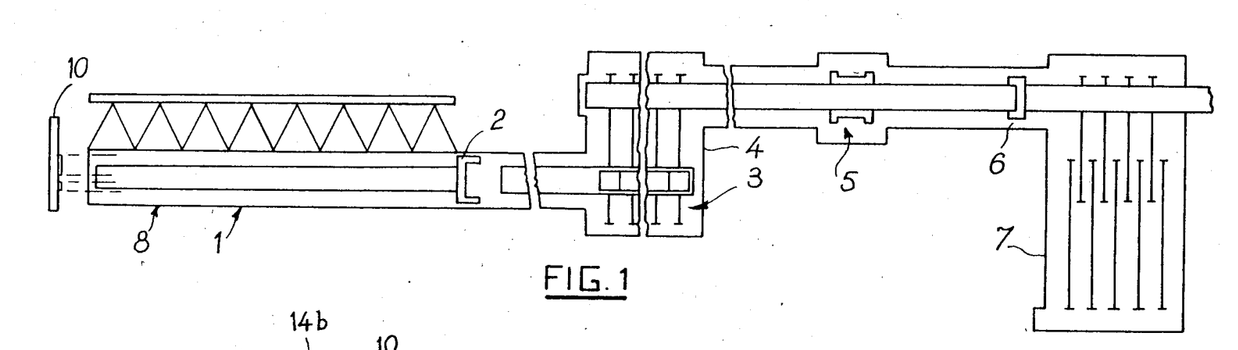
FIG. 1 is a diagrammatic plan view of an installation according to the invention for cutting out in a mother sheet a number of daughter sheets in accordance with a layout established by means of said installation from a theoretical layout.

FIG. 1 shows diagrammatically in plan an installation according to the invention. It comprises a laying out station 1 provided at its downstream end with a shearing device 2 for cutting off the head end of the mother sheets TM after which there is provided a marking unit 3. This unit is mounted above a transfer table 4 adapted to dispose the sheets to be cut out in the path of a double edge shearing device 5 which is followed by a shearing device 6 for cutting the daughter sheets from the mother sheet.

A discharge table 7 for the daughter sheets is provided at the end of the installation.

Figure 2:
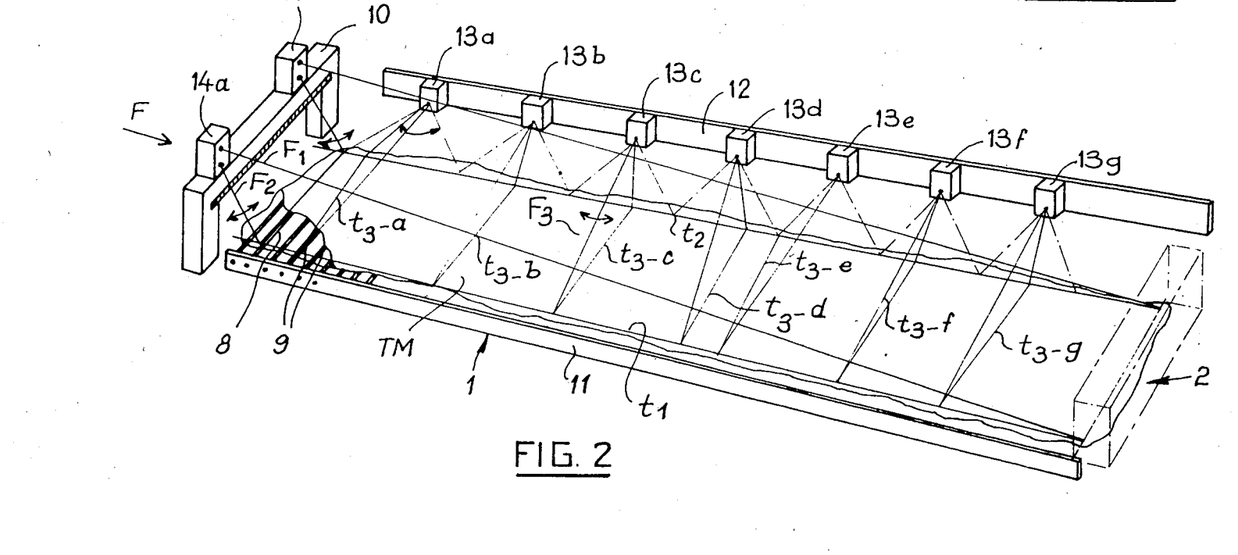
FIG. 2 is a diagrammatic perspective view of the marking station employed in the installation shown in FIG. 1.

The laying out station 1 which is shown in perspective in FIG. 2 comprises a laying out table 8 known per se, the top of which is formed by a set of rollers 9 on which is movable the mother sheet TM coming from the rolling mill (not shown) in which it is produced.

At the upstream end of this table, ie between the latter and the output end of the rolling mill, there is provided a cross-beam 10 which transversely straddles the path defined for the sheet. Provided on the right of the table 8 in the direction of the travel of the sheet, is an edge rod 11 against which the mother sheet is applied in the course of the laying out. Mounted along the opposite side of the table is a series 12 of light sources 13a to 13g (in the presently-described embodiments seven sources), while the cross-beam 10 supports two of the sources indicated by the references 14a and 14b. The light sources are preferably produced with the aid of lasers which may be masked by shutters when the beam they produce is not been used. The light sources 14a and 14b each produce two parallel beams F1 and F2 located in the same plane and oriented downwardly at different angles and are thus able to produce on the mother sheet longitudinal luminous lines $t_1$ and $t_2$. If lasers are employed, the beams F1 and F2 may issue from lasers having a cylindrical optical system or of the sweeping type so that these beams impinge on the entire length of the sheet in accordance with a predetermined sequence.

The light sources 13a to 13g each produce a luminous beam F3 so as to project onto the sheet the same number of transverse lines $t_3$-a to $t_3$-g. These beams are produced preferably by lasers sweeping in a variable plane. The sources 13a to 13g are all pivotally mounted on supports (described hereinafter in detail) so that the line they produce may be placed at will by the operator in a variable predetermined place of a zone of the mother sheet to which the considered laser relates.

In other words, the lines $t_3$-a to $t_3$-g may be moved in the longitudinal direction under the control of the operator by a suitable means controlling the movements of the light sources 13a to 13g.

Figure 3:
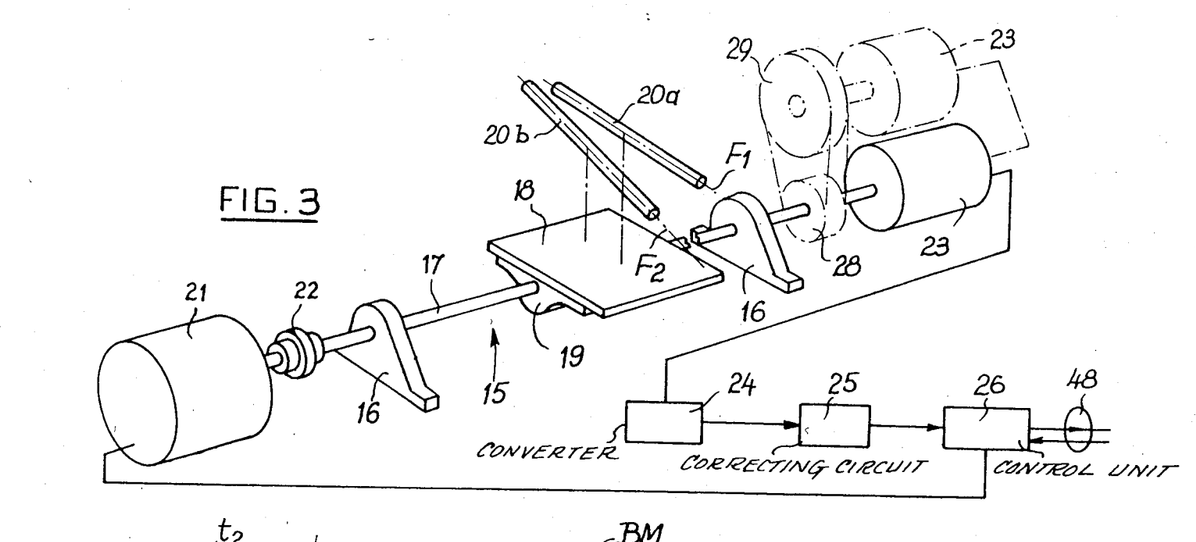
FIG. 3 is a diagrammatic perspective view of the means controlling a couple of edge laying out lasers employed in the installation according to the invention.

FIG. 3 shows a diagram of a device 15 for shifting the light sources 14a and 14b. This device comprises bearings 16 which are fixed to the cross-beam 10 and in which is mounted a ball bearing lead-screw 17. A support carriage 15 comprising nuts 19 is mounted on the lead-screw to be movable in translation when the latter is driven in rotation. This carriage supports one or the other of the light sources 14a or 14b each of which is here provided with two lasers 20a and 20b respectively producing the beams F1, F2.

The lead-screw 17 may be driven in rotation by a step-by-step motor 21 through a coupling 22. An angular encoder 23, preferably of the absolute multi-revolution type, is also coupled to the lead-screw 17. This is capable of generating a binary code of the "Gray" type the value of which is a function of the linear displacement of the carriage 18 along the lead-screw. This code is converted into a pure binary code in a converter 24 which is followed by a circuit 25 for correcting the tolerances in the measurement and a calculating and control unit 26 which is connected to the step-by-step motor 21 and also to a computer 27 (FIG. 5) which will be described hereinafter.

The device 15 for the light source 14b further comprises a speed reducer 28, 29 owing to the relatively great length of the endless lead-screw 17 of this device. This speed reducer is also coupled to an encoder 23 shown in dot-dash lines in FIG. 3.

Figure 4:
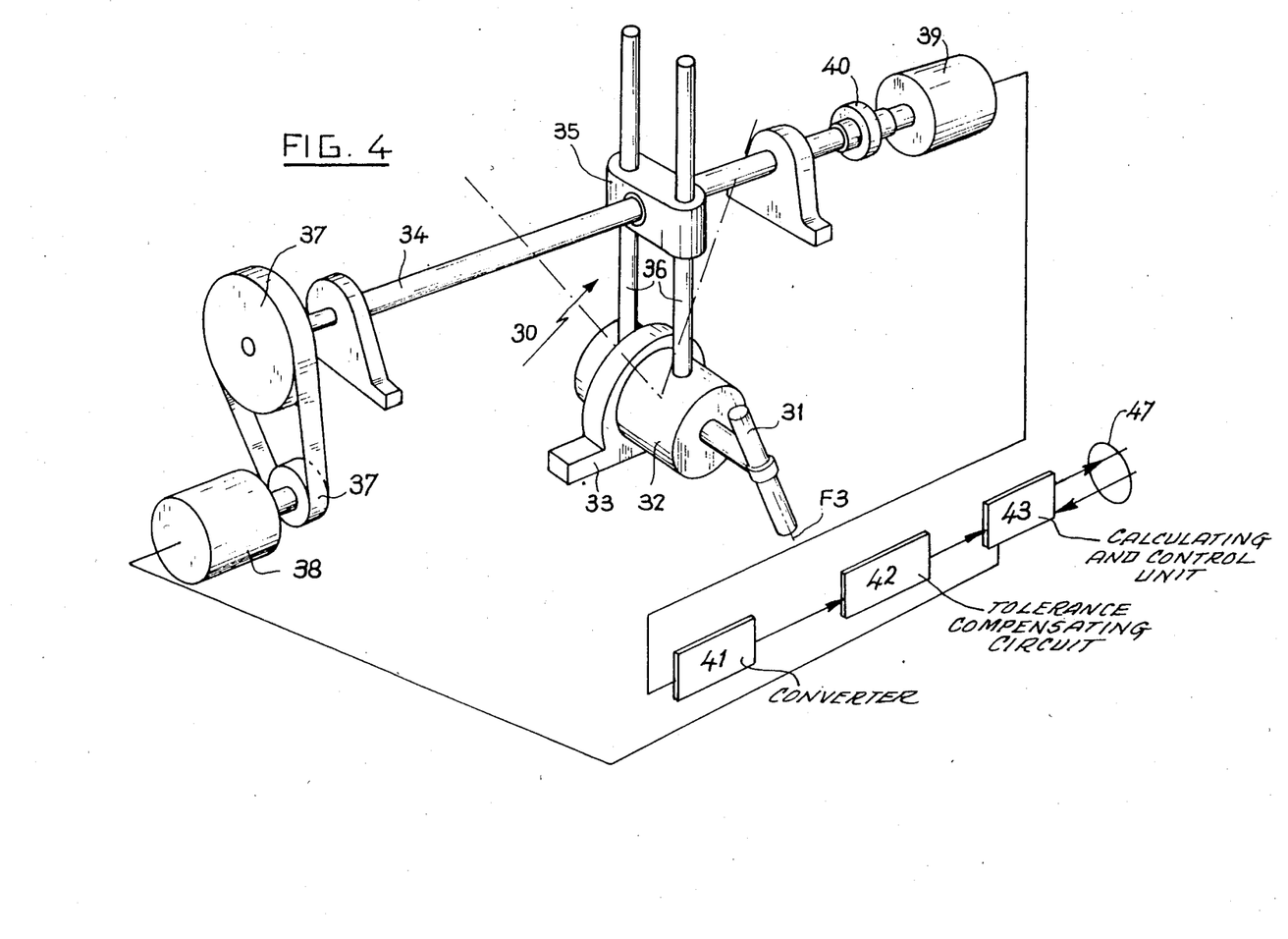
FIG. 4 is similar to FIG. 3 and shows a laser for laying out transverse lines.

FIG. 4 shows a device 30 controlling one of the light sources 13a to 13g. It comprises a sweep laser 31 mounted on a support 32 pivotable about a horizontal axis, the optical axis of the laser being inclined to the horizontal so that the beam F3 may create a transverse line on the mother sheet TM. The pivotal support is pivotally mounted in a fixed bracket 33.

The device further comprises a ball lead-screw 34 on which is mounted a nut 35 which is movable thereon in translation and has extending therethrough two smooth rods 36 which are fixed in the pivotal support 32. The lead-screw 34 is coupled through a speed reducer 37 to a step-by-step motor 38 and to an angular encoder 39 through a coupling 40.

As in the device 18 for the light sources 14a and 14b, the encoder 39 is connected to a converter 41 of the Gray code into a binary code which is followed by a circuit 42 for compensating for the tolerances and to which is connected a unit 43 for calculating and controlling which is connected to the computer 27.

Figure 5:
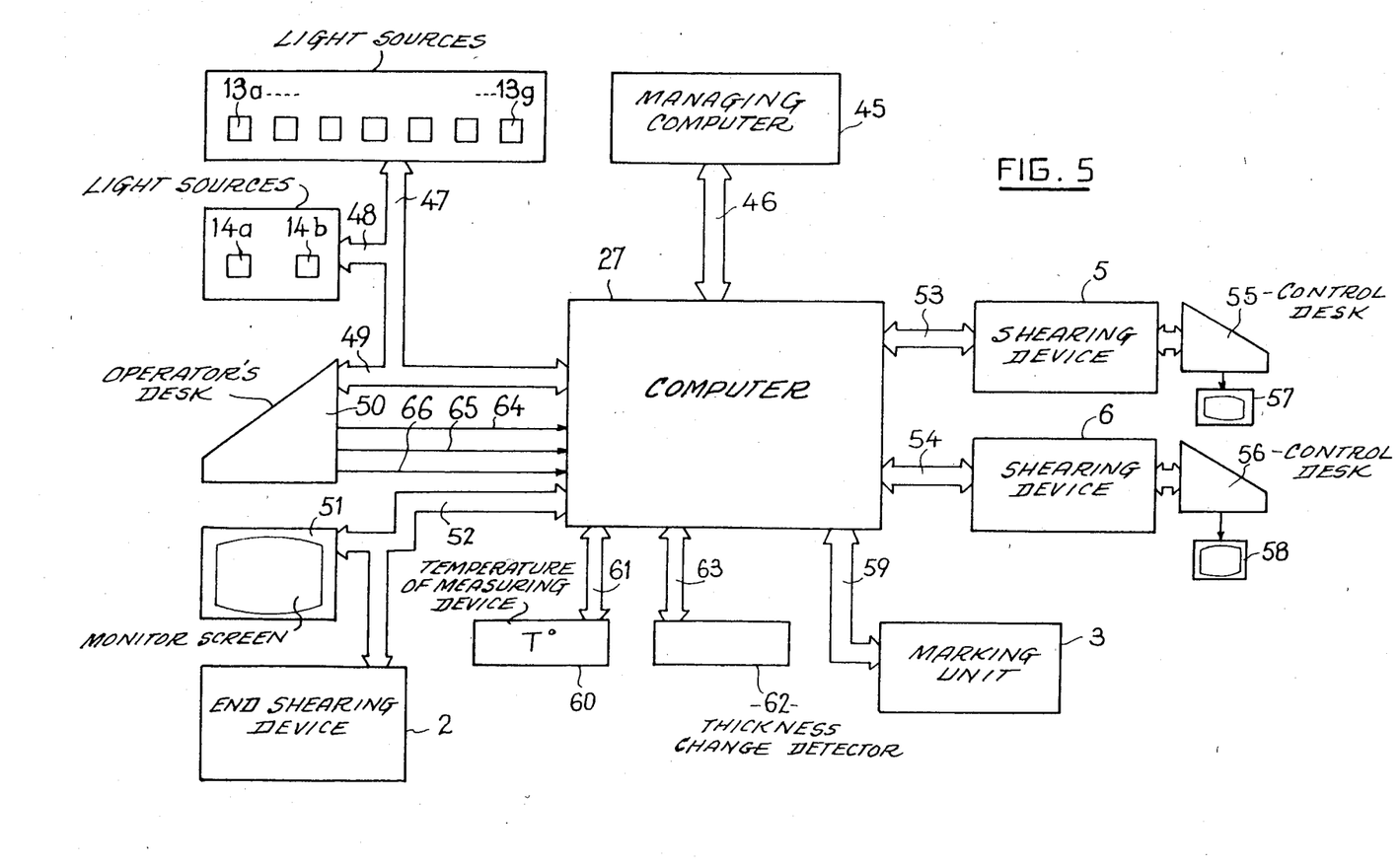
FIG. 5 is a general diagram of the information processing circuit, according to the invention.

FIG. 5 shows a general circuit diagram for processing data and controlling designated by the reference numeral 44. This circuit comprises as the central component the micro-calculator or computer 27 around which the following peripheral units are grouped.

The general management of the controls and the fabrication of the mother sheets and daughter sheets is carried out by means of a central computer 45 of very large capacity which may be the managing computer of the firm in which the installation according to the invention is placed. This computer stores and manages in particular the orders relating to sheets to be delivered to the clients and these orders are transferred through a line 46 to the computer 27 of the present installation in the form of a document termed "layout ticket". This document, which may be produced on the printer, comprises in particular the dimensions and the metallurgical characteristics of the sheets to be treated.

The computer 27 is also connected through lines 47, 48 and 49 respectively to the light sources 13a to 13g and 14a, 14b, to a layout control desk 50 and to a monitor 51 or other display device through a line 52. All these components are disposed in the marking station 1.

The data obtained in the course of the laying out are transferred to the managing computer 45 and also through lines 53 and 54 to the shearing devices 5 and 6 which are provided with control desks 55 and 56 and display screens 57 and 58. They are also sent, as concerns the abscissae determined in the course of the laying out, to the marking unit 3 through a line 59, this unit being adapted to affix on each daughter sheet to be cut out a complete identification information.

The end shearing device 2 is connected to the computer 27 through the line 52.

A device 60 for measuring the temperature is provided for introducing corrections in length and thus compensating for possible expansion of the sheets in accordance with the temperature. This device is connected to the computer 27 through a line 61. Another device 62, connected to this computer through a line 63, permits, if required, taking into account changes in thickness from one sheet to another, which changes may have an effect on the measurements effected by means of the positions of the lasers in the course of the laying out.

The operator desk 50 is also connected to the computer 27 through other lines 64, 65 and 66 through which travel instructions relating to defects ascertained on the mother sheets in the course of the laying out, such as a bent sheet, a sheet under the required length, a sheet having defects which may not be recovered, etc..

The installation just described has for prime function to permit the optimum distribution of the daughter sheets in the mother sheets, which operation is in the main carried out at the layout station 1 and which thus permits determining what those skilled in the art term the "inscribability".

Figure 6:
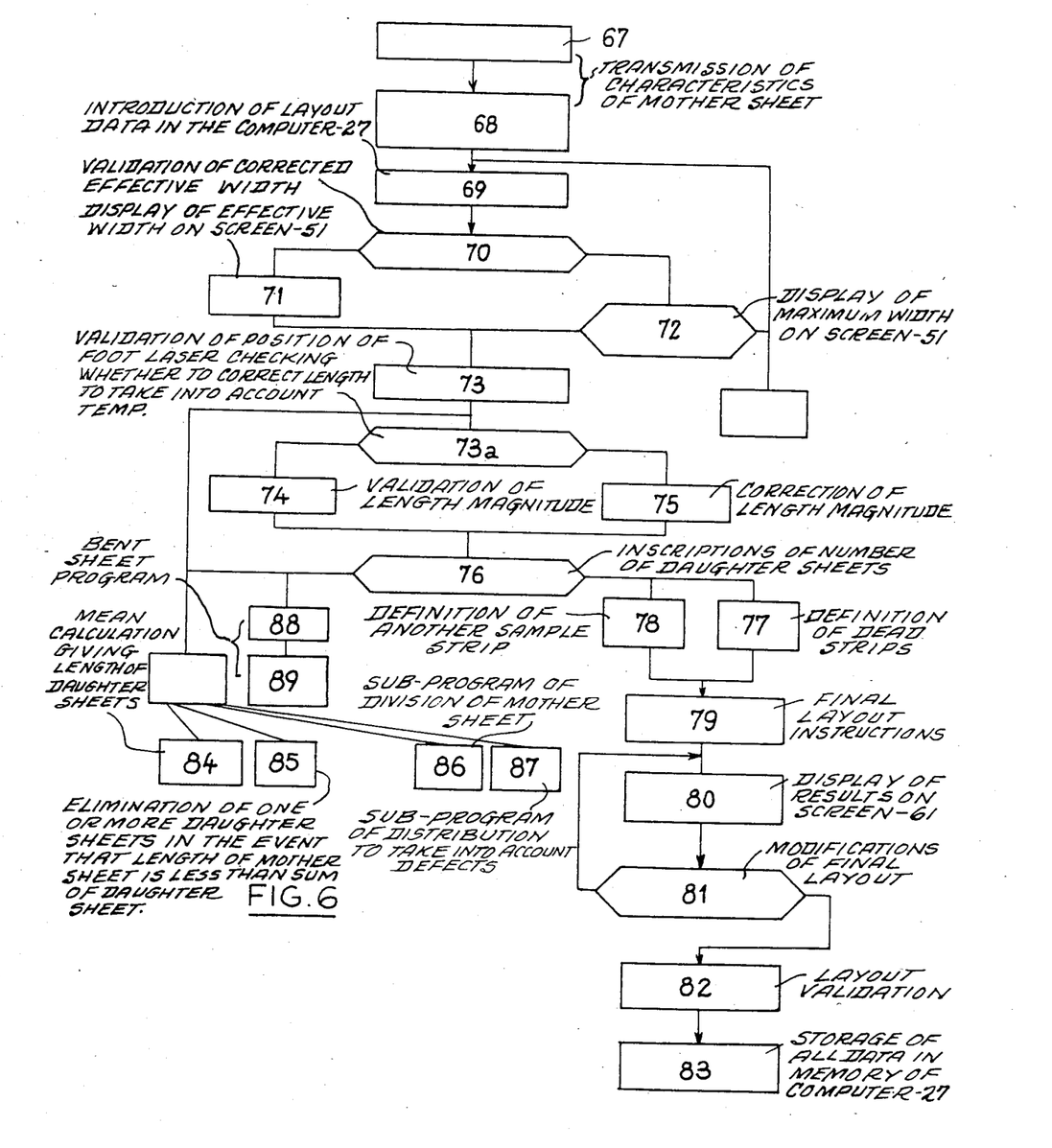
FIG. 6 is a general flowchart of the operations carried out by the circuit shown in FIG. 5.

With reference to FIG. 6, there will now be described the procedure for determining the inscribability which occurs in the layout station with the aid of the circuit 44 shown in FIG. 5.

Upon the arrival of a mother sheet in front of the end shearing device 2, this sheet coming from the rolling mill (the sheet passing under the cross-beam 10), the operator demands, by means of the keyboard of his desk 50, the characteristics of the considered mother sheet in mentioning the rolling number. These characteristics, entered on the "layout ticket", are sent to the computer 27 by the managing computer 45 and are displayed on the screen 51 (operations 67 and 68 in FIG. 6).

The computer 27 having thus received the data concerning the position and the characteristics of the daughter sheets to be laid out, automatically actuates the motor 21 and the light source 14b which displaces the luminous line $t_2$ so as to determine the placement of the left edge of the sheet (as viewed in the direction of displacement), this edge being hereinafter termed "large edge". The sheet of course advances as it is applied against the rod 11 by its opposite edge, hereinafter termed the "small edge". The large edge line $t_2$ is placed at a theoretical distance or dimension $l_{max}$ from this rod 11.

With the sheet positioned in such manner that its front or "head" edge is located under the shearing device 2, its end is sheared and the operator instructs the light source 14a to shift the small edge line $t_1$, this instruction being introduced on the desk 50 and travelling toward the corresponding device 15 (FIG. 3) by way of the calculator 27.

In shifting the line $t_1$, the operator will attempt to move away as far as possible the unevennesses of the edge of the mother sheet from the small edge (FIG. 7), which in the presently-described embodiment can only be achieved at the cost of the loss of a relatively wide strip of the sheet. Indeed, in this embodiment, it is assumed that the mother sheet has a marginal defect D which must of course be eliminated when cutting out the daughter sheets (it will be observed that the size of the defects has been greatly magnified for purposes of explanation).

After having thus shifted the line $t_1$, the operator validates the chosen position on his desk 50 and this introduces the corresponding data in the memory of the computer 27 (operation 69 in FIG. 6).

In the course of the setting of the line $t_1$, the lasers 14a and 14b are shifted together to the same extent and in the same direction so that the lines $t_1$ and $t_2$ maintain the same distance $l_{max}$ therebetween.

The operator checks whether, under these conditions, the inscribability as concerns width is correct (no defect on the right of the line $t_2$ when viewed in the direction of travel of the sheet). If it is correct, the inscribability as concerns width is determined and the position of the line $t_2$ is validated by the operator and stored in the memory of the computer 27. In the opposite case, the operator effects a correction and thereafter validates the new position (operation 70) which results in an effective width less than the maximum width (which case is not shown in FIG. 7).

Owing to the presence of the defect D in the opposite edge, the mother sheet has, in the illustrated embodiment, a useful or effective width $l_u$ which is indeed less than the width $l_{max}$, but this defect can be eliminated in another manner, as will be understood, the daughter sheets finally cut out having therefore the width $l_{max}$ notwithstanding the presence of the defect.

The inscribability data as concerns the effective width and the maximum width appear on the screen 51 of the operator (operations 71 and 72).

The installation is then ready to receive the data leading to the inscribability as concerns the length of the mother sheet TM. The end shearing device 2 provides a length reference of the sheet after having cut the head end and/or cut a sample. However, according to a modification, this length reference may also be obtained optically by means of one of the transverse lasers (13a to 13g). This laser will then be termed the "head laser".

The operator then selects and positions one of the transverse lasers of the series or system 12 in accordance with the theoretical length of the sheet (foot laser), so as to separate any unevenness from the opposite edge of the head and validate the position thus chosen. This operation then delivers to the computer 27 an effective length magnitude between the cutter of the shearing device 2 and the validated position of the foot laser, bearing in mind, as the case may be, the taking of the sample portion at the head end of the sheet. Samples may if desired be defined in other regions of the sheet and the length data relating thereto are extracted from the managing computer 45 which applies them to the concerned lasers of the system 12 through the computer 27.

The position of the foot laser is then validated (operation 73).

The computer 27 having received temperature data from the device 60 (FIG. 5), it is inquired whether it is necessary to correct the value of the measured length in order to compensate for expansion (operation 73a). The operator can thereafter validate this length (74) or correct it (75).

In the absence of defects, the computer 27 is now ready to inscribe in the mother sheet TM a number of daughter sheets (operation 76) bearing in mind, on one hand, the layout ticket it received from the computer 45 and, on the other hand, the dimensions measured by the edge lasers and the foot laser.

Various sub-programs may be connected to the last-mentioned operation.

Figure 7:
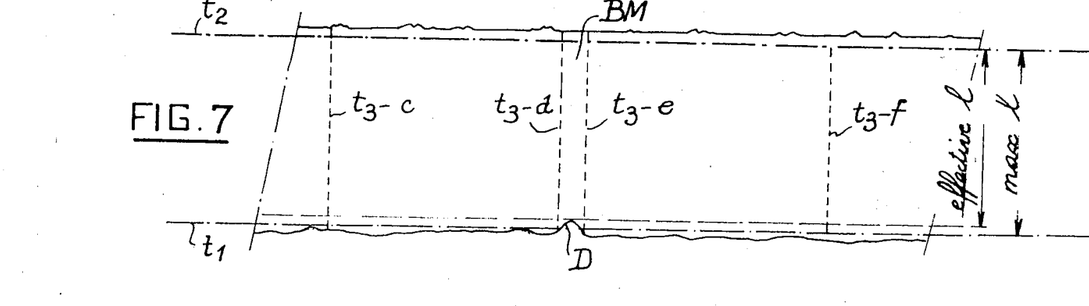
FIG. 7 is a diagrammatic plan view of a mother sheet in the course of the laying out.

First of all, as shown in FIG. 7, the operator can (at 77) proceed to define "dead strips" BM in order to isolate the defect D in the sheet (or another defect located elsewhere in the sheet) by an appropriate actuation of the lasers which are in this case the lasers 13d and 13e.

The operator can also define an additional sample strip (at 78) after which the program progresses to an operation demanding the laying out at 79 which initiates the calculation on the part of the computer of the final laying out of the sheet in accordance with all the previously introduced data. The computer positions all the lasers from the laser 13a to the foot laser. Consequently, the result is displayed on the screen 61 (operation 80).

If at 81 the operator wishes to modify this final layout, the program returns to operation 80 so that a corrected layout can be established.

The program then passes to a layout validation operation 82 which stops any modification in the layout station 1, the layout being then maintained set until the sheet has been discharged.

It will be understood that, after the validation, the computer 27 stores all the data in its memory (83).

In the foregoing description, it has been assumed that the treated mother sheet permits, in any case, a division thereof into daughter sheets in accordance with the laying ticket and orders defining the parameters of the daughter sheets taking into account tolerances pertaining to the mother sheet, the temperature, the thickness of the sheet, etc..

However, in some cases, the accumulation of the tolerances does not permit the laying out with an optimum division or distribution and, in this case, the installation according to the invention enables a distribution compromise to be found which nonetheless results in an optimum utilisation of the material of the mother sheet while remaining within the tolerances required for the product leaving the installation.

Generally, the daughter sheets are sold with a nominal length dimension $c_n$ which, apart from an exception which will be mentioned hereinafter, must never be exceeded beyond the lower limit. On the contrary, the sheets are delivered at this nominal dimension increased by a positive tolerance e, it being customary to require that the length of the delivered product have, as far as possible, the dimension $c_n + e$ termed the maximum length $L_{max}$.

When, at the end of the operation 76 of the procedure (FIG. 6), the operator has determined and validated the effective length $L_u$ of the mother sheet, it could occur that this length be insufficient, bearing in mind the length of the strip removed, to enable the cutting out of the daughter sheets required by the layout ticket so that all have a dimension $c_n + e$.

If the effective length $L_u$ of the mother sheet is then greater than the sum of the lengths of dimension c of the daughter sheets and the minimum dimension of the removed strip, the computer 27 effects a mean calculation which gives, in the course of the laying out, a length to the daughter sheets of magnitude $c_n < c < c_n + e$ (operation 84, FIG. 6).

On the other hand, if the effective length $L_u$ is less than the sum of the lengths of dimension c of the daughter sheets and the removed strip, the computer is so programmed as to establish a division or distribution which eliminates one or more daughter sheets, the scrap of the mother sheet being then recycled (operation 85).

In some cases, the daughter sheets may be fabricated with a tolerance in the neighbourhood of the nominal value, for example in the case where these sheets are used in the manufacture of tubes.

In this case, after the effective length $L_u$ of the mother sheet is determined at 76, the operator introduces limit values $L_M$ and $L_m$ of the allowed range of tolerances. The computer 27 is then so actuated as to effect a subprogram of distribution or division (operation 86) which is based on a calculation for establishing the number x of sheets of length $L_M$ and the number y of sheets of length $L_m$.

In a first stage, this sub-program checks whether $L_u$ is divisible by $L_M$. If this is so, the computer indicates the number $x = L_u/L_M$ of sheets of maximum length $L_M$, the number y of sheets of minimum length $L_m$ being then equal to zero.

If $L_u$ is not divisible by $L_M$, the computer carries out the following algorithm:

$$x = E\left[\frac{L_u - E\left[\frac{L_u}{L_m}\right] \cdot L_M}{L_M - L_m}\right]$$

$$y = E\left[\frac{L_u}{L_m}\right] - x$$

wherein:
x=number of sheets of length $L_M$ (maximum)
y=number of sheets of length $L_m$ (minimum)

$L_u$=effective length of the mother sheet
E=factor indicating the ratio of the sum of the lengths of the daughter sheets to the effective length of the mother sheet.

This algorithm consequently enables the computer 27 to determine the maximum number of daughter sheets which can be laid out in a given mother sheet.

The sub-program may include instructions introduced as desired by the operator and resulting in laying out of daughter sheets whose lengths are between $L_M$ and $L_m$ in accordance with the formula:

$$L_M > L_i = \frac{L_u - xL_M}{y} > L_m$$

wherein $L_i$ is the intermediate length of the daughter sheets.

The computer may also introduce a distribution sub-program (operation 87) which takes into account defects in the mother sheet which were previously noted. In this case, the computer 27 considers each section of the mother sheet TM devoid of a defect as a mother sheet of length $L'_u$ which is considered to be a new mother sheet in which the division into daughter sheets can be effected as described hereinbefore.

The sub-program includes instructions enabling non utilisable strips in these "secondary" mother sheets to be grouped as a consequence of the distribution calculation, with strips having a defect, which results in an optimum utilisation of material.

If the operator has found that the effective width $l_u$ found during the operation 70 is not sufficient, he visually examines the sheet so as to check whether the sheet is under width or has a bent shape so that a correct division in length cannot be carried out normally. The sheets are generally always presented on the marking table 1 in such manner that their concave edge is facing the rod 11.

Figure 8:
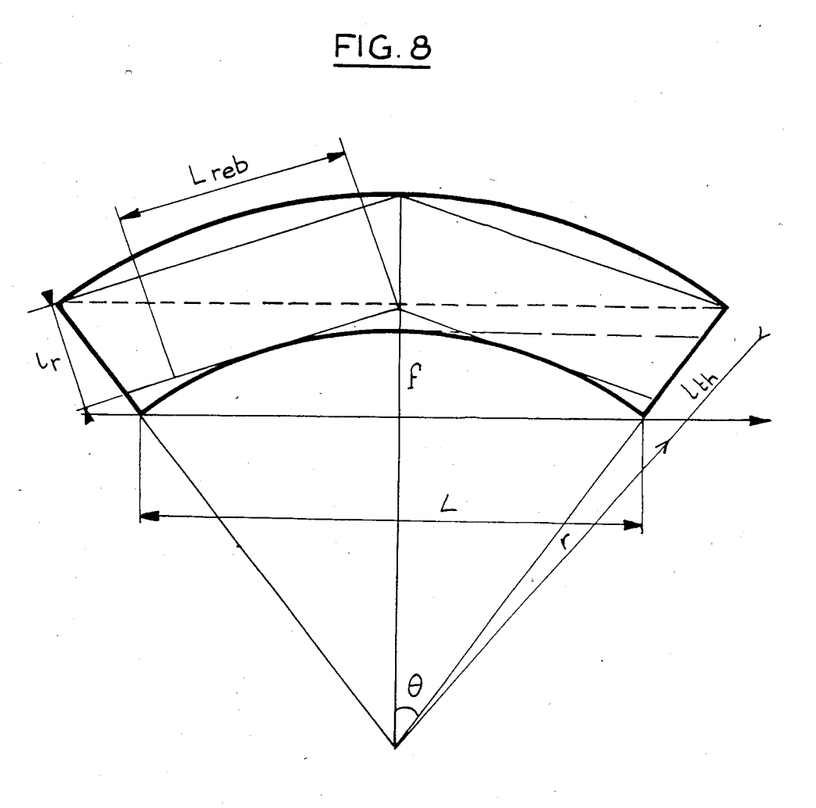
FIG. 8 is a diagrammatic geometric representation illustrating the calculation effected for determining the inscribability of a bent mother sheet.

If he finds that the sheet is bent, the operator initiates (operation 88) the sub-program "bent sheet" (operation 89) and the computer 27 can then calculate the inscribability in accordance with the following algorithm (FIG. 8):

$$l_r = l_{th}\left[1 - \frac{2f^2}{L^2}\right] - \frac{f}{4}\left[1 + \frac{4f^2}{L^2}\right]$$

$$L_r + L_{reb} = L\left[\frac{1 + \frac{4f^2}{L^2} + \sqrt{1 + \frac{4f^2}{L^2}}}{2}\right]$$

wherein:
$l_r$=recoverable width of the bent mother sheet
$l_{th}$=theoretical width of the bent mother sheet
f=the rise of the inner arc (adjacent to the rod 11) of the bent mother sheet
L=length of the chord of the inner arc
$L_r$=recoverable length
$L_{reb}$=recoVerable length after the cutting of the end of the mother sheet The calculation of $L_{reb}$ and $L_r$ permits the determination of the inscribability as concerns width by comparison of $l_r$ and $l_{max}$ of the daughter sheets to be laid out and the number of daughter sheets to be distributed on the recoverable length.

After the operation 83 for storing the inscribability information, the computer 27 may be actuated for transmitting the corresponding data to the other devices of the cutting installation and in particular to the marking machine 3, to the edge shearing device 5 and to the shearing device 6 for cutting to length, it being possible also to store the data in the central managing computer 45.

The marking unit 3 receives the data of length corresponding to the beginnings of the daughter sheets and, by means of these data, affixes a mark to the daughter sheets thus identified.

The same may be true as concerns the shearing devices 5 and 6 which may be actuated directly by the inscribability data determined at the layout station or may be actuated by an operator who receives these data and introduces them in the control desk pertaining to the shearing devices.

In the latter case, a cutting plan of the daughter sheets is transmitted to the operator of the shearing device 6. This plan includes the instructions for positioning the moving abutment of the shearing device required for obtaining the daughter sheets.

Having now described our invention what we claim as new and desire to secure by Letters Patent is:

1. A process for the treatment of rough mother sheets issuing from a rolling mill so as to cut said sheets into daughter sheets of predetermined dimensions, comprising the steps of determining an inscribability of each mother sheet for establishing a layout permitting an optimum utilization of the mother sheet and then passing each mother sheet into means for cutting the mother sheet to length and to width so as to cut out the daughter sheets, the determination of the inscribability comprising the steps of projecting onto the mother sheet a network of crossing luminous lines, selectively displacing each of said luminous lines while maintaining each line parallel to an original position of each line so as to define on the mother sheet a batch of daughter sheets to be obtained, determining length and width coordinates of the luminous lines relative to a reference system pertaining to the mother sheet and cutting the mother sheet in accordance with the determined coordinates.

2. A process according to claim 1, comprising cutting a transverse end of the mother sheet so as to obtain a length reference of said reference system.

3. A process according to claim 1, wherein a length reference of said system of coordinates is established by a luminous line which is projected transversely of the mother sheet.

4. A process according to claim 1, wherein one of the luminous lines extends longitudinally of the mother sheet and constitutes a width reference of said reference system.

5. A process according to claim 1, wherein the determination of the inscribability comprises the steps of shifting luminous lines which extend longitudinally of the mother sheet so as to determine the inscribability as concerns width of the mother sheet and then shifting luminous lines which extend transversely of the mother sheet so as to determine the inscribability as concerns length of the mother sheet.

6. A process according to claim 5, comprising, in the course of the determination of the inscribability as concerns width, shifting a first one of the longitudinal luminous lines so as to move it away from unevennesses of a first longitudinal edge of the mother sheet and shifting a second longitudinal luminous line opposed to said first longitudinal line in accordance with a theoretical width of the mother sheet, then checking whether said second longitudinal luminous line is spaced away from unevenness of a second longitudinal edge opposed to said first longitudinal edge of the mother sheet and correcting, if required, the position of said second luminous line so as to space it from a larger edge unevenness, and validating the positions of the longitudinal luminous lines so as to determine the width coordinates.

7. A process according to claim 6, comprising, in the course of the determination of the inscribability as concerns length of the mother sheet, shifting a foot luminous line which is the luminous line closest to an edge of the mother sheet opposed to a head reference edge of the mother sheet and thereby determining the effective length of said sheet avoiding unevennesses of said edge, positioning other intermediate transverse luminous lines in accordance with lengths of the daughter sheets to be obtained, and validating the positions of all the transverse luminous lines so as to determine the length coordinates.

8. A process according to claim 7, comprising, in the course of the determination of the length inscribability, shifting at least certain of the transverse luminous lines so as to avoid edge defects present in the mother sheet.

9. A process according to claim 7, comprising automatically shifting said other transverse luminous lines as a function of calculations for obtaining optimum utilization of the mother sheet effected by a computer, length data of said batch of daughter sheets to be obtained being introduced in said computer.

10. A process according to claim 9, comprising measuring the temperature of the mother sheet in the course of the laying out and coorecting the positions of the transverse luminous lines in accordance with the results of said measurement.

11. A process according to claim 9, comprising correcting the positions of the transverse luminous lines as a function of the thickness of the mother sheet.

12. A process according to claim 9, comprising positioning the transverse luminous lines as a function of dimensions which correspond to upper limits of tolerance ranges to within which the daughter sheets must be cut.

13. A process according to claim 12, comprising, in the case where the sum of the lengths of the daughter sheets corresponding to said upper limit exceeds said effective establishing length of the mother sheet, lengths for the daughter sheets whose values are within the limits of said tolerances.

14. A process according to claim 9, comprising selectively positioning the transverse luminous lines for determining a part of said batch of daughter sheets having a length corresponding to a maximum length of a tolerance range and a part of said batch having a length corresponding to a minimum length of said tolerance range, in accordance with the algorithm:

$$x = E\left[\frac{L_u - E\left[\frac{L_u}{L_m}\right] \cdot L_M}{L_M - L_m}\right]$$

$$y = E\left[\frac{L_u}{L_m}\right] - x$$

wherein:
- $x$ = number of daughter sheets of length $L_M$
- $y$ = number of daughter sheets of length $L_m$
- $E$ = factor indicating the ratio of the sum of the lengths of daughter sheets to said effective length ($L_u$) of the mother sheet.

15. A process according to claim 9, comprising, for effecting the inscribability of a mother sheet bent in the direction of the length, positioning said network of longitudinal luminous lines and transverse luminous lines according to the algorithm:

$$l_r = l_{th}\left[1 - \frac{2f^2}{L^2}\right] - \frac{f}{4}\left[1 + \frac{4f^2}{L^2}\right]$$

$$L_r + L_{reb} = L\left[\frac{1 + \frac{4f^2}{L^2} + \sqrt{1 + \frac{4f^2}{L^2}}}{2}\right]$$

wherein:
- $l_r$ = recoverable width of the bent mother sheet
- $l_{th}$ = theoretical width of the bent mother sheet
- $f$ = the rise of the inner arc of the bent mother sheet
- $L$ = length of the chord of the inner arc
- $L_r$ = recoverable length
- $L_{reb}$ = recoverable length after cutting the end of the mother sheet.

16. An installation for the treatment of rough mother sheets issuing from a rolling mill so as to cut said sheets into daughter sheets of predetermined dimensions, the sheets having longitudinal edges and issuing longitudinally from the rolling mill, said installation comprising a layout zone, means for cutting the mother sheet to dimensions, and means for optically determining the inscribability of a given number of daughter sheets in each mother sheet, said means for optically determining the inscribability comprising in said layout zone a group of first light sources each capable of projecting a longitudinal luminous line on the mother sheet to extend longitudinally of the mother sheet, said sources being mounted in such manner as to be laterally movable relative to said longitudinal edges of the mother sheet, a group of second light sources each being movable so as to project a luminous line which is movable over the mother sheet while being maintained parallel to an original position of the luminous line and extends tranversely of the longitudinal edges of the mother sheet, shifting means drivingly connected to said first and second light sources for shifting said light sources, position detecting means drivenly connected to said first and second light sources for detecting the evolution of the position of the light sources relative to said mother sheet and having output means delivering signals corresponding to the detected positions, and information processing means having an output and an input which is connected to said output means of said position detecting means and capable, in response to said signals from said position detecting means, of producing signals at said output which is connected to said input means of said shifting means for positioning the sources in accordance with a given layout.

17. An installation according to claim 16, wherein said light sources comprise sweeping lasers.

18. An installation according to claim 16, wherein said light sources comprise lasers having a cylindrical optical element.

19. An installation according to claim 16, wherein said shifting means comprise a step-by-step driving motor, a lead-screw, a support which is coupled to the considered light source and is movable along said lead-screw upon rotation of the lead-screw, said motor being coupled to the lead-screw, and said detecting means also being coupled to the lead-screw.

20. An installation according to claim 19, wherein the first light sources are directly mounted on their support and said lead-screw is mounted on a cross-beam which is placed in front of the layout zone and straddles a path in which the mother sheets travel.

21. An installation according to claim 19, wherein the second light sources are each mounted on a mounting element which is pivotable about a horizontal axis, said mounting element being pivotable about said axis by a mechanism which couples it to said support, the optical axis of said light source being downwardly inclined and all the second light sources being mounted in spaced-apart relation on a system which is placed parallel to the layout zone.

22. An installation according to claim 16, wherein a device for establishing a head reference is mounted at an end of the layout zone opposed to the first light sources.

23. An installation according to claim 22, wherein said computer is connected to circuits actuating means for cutting the mother sheet to dimensions for the transmission of position data of the light sources at the end of the laying out.

24. An installation according to claim 16, comprising a computer connected to receive position signals coming from said detectors and for transmitting command signals to said driving means, said computer being moreover connected to a control desk with an associated display screen.

25. An installation according to claim 24, wherein said computer is also connected to a circuit for detecting the temperature of the mother sheet for the purpose of compensating for expansion of the mother sheet.

26. An installation according to claim 24, comprising a circuit for determining the thickness of the mother sheet and connected to said computer for compensating for layout errors due to different thicknesses of the sheets to be treated.

27. An installation according to claim 24, further comprising a marking unit for affixing to each mother sheet identification indications of the daughter sheets in accordance with signals of position of said light sources coming from said computer.

* * * * *